United States Patent [19]

Dore

[11] 4,051,116
[45] Sept. 27, 1977

[54] ASSYMMETRICAL 1:2 COBALT COMPLEXES OF METALLIZABLE MONOAZO COMPOUNDS HAVING ONE SULFO GROUP PER COMPLEX

[75] Inventor: Jacky Dore, Basel, Switzerland

[73] Assignee: Sandoz Ltd., Basel, Switzerland

[21] Appl. No.: 533,521

[22] Filed: Dec. 17, 1974

Related U.S. Application Data

[63] Continuation-in-part of Ser. No. 189,768, Oct. 15, 1971, abandoned.

[51] Int. Cl.² .................. C09B 45/10; C09B 45/20; C09B 45/30; D06P 1/10
[52] U.S. Cl. .................. 260/145 A; 260/149; 260/151; 260/193
[58] Field of Search .................. 260/145 A

[56] References Cited

U.S. PATENT DOCUMENTS

| | | | |
|---|---|---|---|
| 3,005,813 | 10/1961 | Brassel et al. | 260/145 A |
| 3,040,019 | 6/1962 | Neier | 260/145 A |
| 3,169,123 | 2/1965 | Neier | 260/145 A |
| 3,185,676 | 5/1965 | Klein | 260/145 A |
| 3,203,948 | 8/1965 | Neier | 260/145 A |
| 3,221,003 | 11/1965 | Scholl et al. | 260/145 |
| 3,632,568 | 1/1972 | Neier | 260/145 A |

FOREIGN PATENT DOCUMENTS

| | | | |
|---|---|---|---|
| 1,085,262 | 1/1955 | France | 260/145 A |
| 1,092,850 | 4/1955 | France | 260/145 A |
| 1,115,426 | 4/1956 | France | 260/145 A |
| 1,431,264 | 8/1969 | France | 260/145 A |
| 1,466,877 | 1/1970 | France | 260/145 A |
| 1,476,587 | 2/1970 | France | 260/145 A |
| 1,094,746 | 12/1967 | United Kingdom | 260/151 |

OTHER PUBLICATIONS

Merck Index, 7th Edition, p. 957 (1960).

*Primary Examiner*—Floyd D. Higel
*Attorney, Agent, or Firm*—Gerald D. Sharkin; Richard E. Vila; Melvyn M. Kassenoff

[57] ABSTRACT

Complexes of the formula

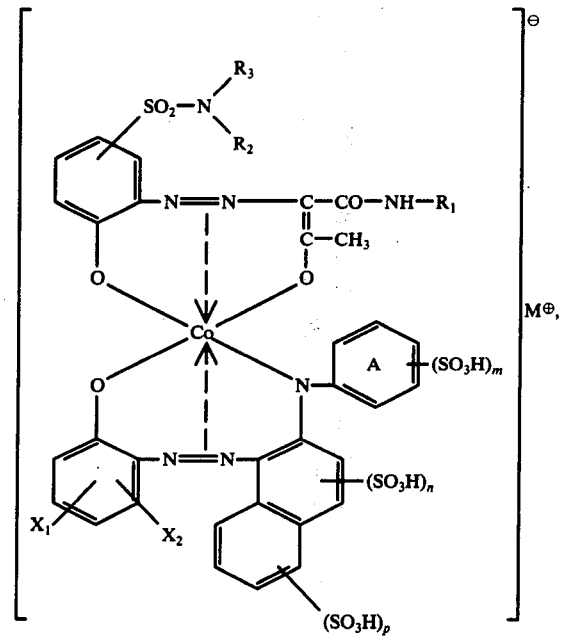

wherein $R_1$ is hydrocarbyl or substituted hydrocarbyl,
each of $R_2$ and $R_3$ is independently hydrogen, lower alkyl or substituted lower alkyl,
each of $X_1$ and $X_2$ is independently halo, nitro, alkyl, substituted alkyl, alkoxy or substituted alkoxy,
$M^+$ is a cation, e.g., lithium, sodium, potassium or ammonium, and
$m$ is 0 or 1,
$n$ is 0 or 1, and
$p$ is 0 or 1, with the proviso that the sum of $m$, $n$ and $p$ is 1, and derivatives thereof wherein Ring A is substituted. These complexes are good dyes for neutral and synthetic polyamide fibers (e.g., wool, silk and Nylon) as well as for leather and light metals (e.g., aluminum)... The shades of the dyeings range from olive to yellowish-green to khaki-brown. The dyeings have notable fastness to light, wet treatments, rubbing and pressing and stability to alkalis and acids and satisfactory dischargeability. The dyes build-up on polyamides from neutral medium.

20 Claims, No Drawings

ASSYMMETRICAL 1:2 COBALT COMPLEXES OF METALLIZABLE MONOAZO COMPOUNDS HAVING ONE SULFO GROUP PER COMPLEX

This application is a continuation-in-part of application Ser. No. 189,768, filed Oct. 15, 1971 and now abandoned.

This invention relates to new 2:1 cobalt complexes of a 1:1 cobalt complex of an aminophenol→2-phenylaminonaphthalene sulfonic acid azo dye and an aminophenolsulfonamide→Acetoacetyl-phenylamideazo dye.

More particularly the new dyes correspond to the formula

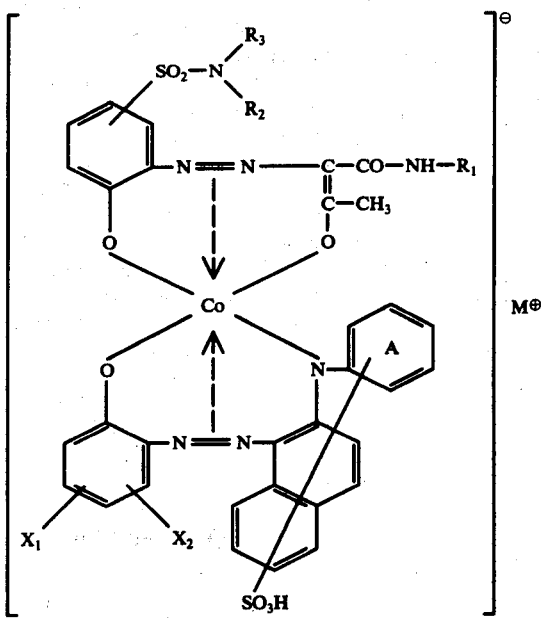

(I)

where $R_1$ stands for a hydrocarbon radical which may be substituted, $R_2$ and $R_3$ each stands for hydrogen or a lower alkyl radical which may be substituted, $X_1$ and $X_2$ each stands for halogen, a nitro group or an alkyl or alkoxy radical which may be substituted, M+ for a cation, and the ring A may be further substituted.

The aforestated cobalt complex compounds can be produced by reacting a 1:1 cobalt complex of a monoazo compound of the formula

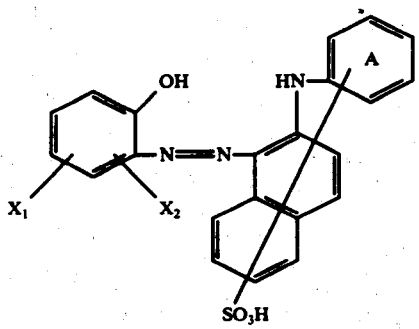

(II), where $X_1$ and $X_2$ have one of the aforestated meanings, with a monoazo compound of the formula

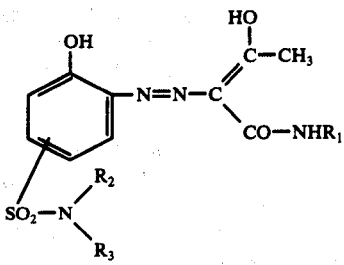

(III), where $R_1$, $R_2$ and $R_3$ likewise have the aforestated meanings.

Alkyl, cycloalkyl and aryl radicals are suitable for substituents $R_1$. The alkyl radicals contain preferably 1 to 12 carbon atoms, may be straight or branched and may bear further substituents such as halogen atoms, alkoxy groups, cyano groups and the like. The first choice as aryl radicals are phenyl radicals which also may be substituted by halogen atoms such as chlorine or bromine, alkyl or alkoxy radicals, a cyano group, the carboxy group, an alkoxycarbonyl group and the like.

The radicals $R_2$ and $R_3$ may be hydrogen or lower alkyl radicals which may be straight or branched and may bear further substituents such as halogen atoms or hydroxy or lower alkoxy groups.

If $X_1$ and $X_2$ represent halogen, chlorine and bromine are the preferred meanings. The trifluoromethyl group also is a preferred substituent. The alkyl or alkoxy radicals, which may be substituted, are preferably lower radicals having 1 to 6 carbon atoms and if they are substituted they bear substituents such as halogen, primarily chlorine or bromine, the trifluoromethyl group or cyano radicals. It is preferable for one or both the radicals $X_1$ and $X_2$ to be nitro groups.

The cation $M^{30}$ is preferably a lithium, sodium, potassium or ammonium cation.

The preferred 2:1 cobalt complex compounds of the general formula (I) above are those in which the radical $R_1$ is a straight or branched alkyl radical having 4 to 12 carbon atoms, a phenyl radical or a cycloalkyl radical, $R_2$ and $R_3$ are hydrogen or lower alkyl radicals with 1 to 4 carbon atoms, $X_1$ and $X_2$ are nitro groups or halogen atoms, and where the $SO_3H$ group occurs in the ring A and this ring is not substituted further.

More specially preferred 2:1 cobalt complex compounds of the present invention are those in which the radical $R_1$ is a branched alkyl radical with 6 to 10 carbon atoms or a phenyl radical, $R_2$ and $R_3$ are hydrogen, $X_1$ and $X_2$ are nitro groups, chlorine or bromine atoms in the 4- and 6-positions to the oxygen group on the benzene radical, the $SO_2$-$NR_2R_3$ group (preferably $SO_2NH_2$ group) occupies the 4- or 5-position to the oxygen group on the benzene radical and the $SO_3H$ group in the ring A of formula (I) is in the 2- or 4-position to the amino group. The 2:1 cobalt complex compounds disclosed herein are best produced in aqueous or aqueous-organic solutions. The starting 1:1 cobalt complexes, which in part are known and whose formation is described below, are reacted preferably with stoichiometric amounts of the metal-free monoazo dye. The reaction takes place in alkaline solution and is allowed to proceed until the entire amount of the 1:1 cobalt complex has reacted. The 2:1 cobalt complex formed is then salted out, washed with a concentrated salt solution, collected and dried. The 2:1 cobalt complexes produced in accordance with this invention are readily soluble in water.

Some 1:1 cobalt complexes required as starting materials are known and are described in the literature, for example in French Pat. Nos. 1,431,264, 1,466,877 and 1,476,587.

The preferred starting material is a 1:1 cobalt complex which can be produced as follows. An azo dye of formula (II) is reacted with an agent donating cobalt in the presence of a nitrite, either in water, in a mixture of water and an organic solvent or in an organic solvent alone. The suitable temperature range for the reaction is about 0° to 60° C, the optimum range being 10°–30° C, and the reaction medium is set in the acid region, i.e. at a pH from 3 to 7 or preferably pH 5 to 6.

Cobalt donating compounds particularly suitable for the reaction include cobaltous formate, acetate, nitrate and sulphate. For formation of the 2:1 cobalt complex compounds it is best to employ 3–6 mols of the nitrite per gram atom of cobalt. In comparison with the known methods of cobalt complex formation the new process disclosed herein has the advantage that the 1:1 cobalt complex compounds are obtained in much greater purity and homogeneity; they are in fact quite free from by-products. It has been found that by using these highly pure 1:1 cobalt complexes, substantially pure asymmetrical 2:1 complexes are obtained (at least 95% pure).

The monoazo compounds of formula (III) employed as second starting material are for the most part known or can be produced by known methods. Their production is described, for example, in French Pat. Nos. 1,107,888 and 1,061,329.

As is evident to those in the art, the sulpho group of the complexes is usually in salt form, e.g. alkali metal salts.

The new 2:1 cobalt complex compounds obtained in accordance with this invention are useful for the dyeing of natural and synthetic polyamide fibers, e.g. wool, silk and nylon, and for the dyeing of leather and metals, notably aluminum.

The dyes disclosed herein give dyeings which have notable fastness to light and wet treatments (water, sea water, milling and perspiration) with notable rubbing fastness. The dyes build up on polyamide fibres from neutral medium and as they are of asymmetrical nature, they show the desired property of a uniform rate of dyeing, in contrast to the compounds described in Swiss Patent 317,120. Furthermore, the dyeings obtained have notable wash fastness, hot water fastness, pressing fastness, are stable to alkali and acids and have satisfactory dischargeability. The dyeings made on wool exhibit notable carbonization fastness.

In the following Examples the parts are by weight and the temperatures in degrees centigrade.

EXAMPLE 1

The 1:1 cobalt complex from 51 parts of the monoazo dye 2-amino-1-hydroxy-4, 6-dinitrobenzene-2-phenylaminonaphthalene-4'-sulphonic acid, whose method of production is described below, and 41 parts of the dye formed by coupling diazotized 2-amino-1-hydroxybenzene-4-sulphonic acid amide to 1-acetoacetylamino-2-ethylhexane are stirred into 500 parts of water and 150 parts of alcohol, then dissolved by the addition of sodium hydroxide solution at pH 12.0 and 20°. Stirring is continued for a few hours at 20° until the 1:1 cobalt complex has completely disappeared. The solution is filtered and potassium chloride is added to salt out the dye. It is filtered, washed with 20% potassium chloride solution and dried. The dye obtained, which is at least 95% pure, has the formula

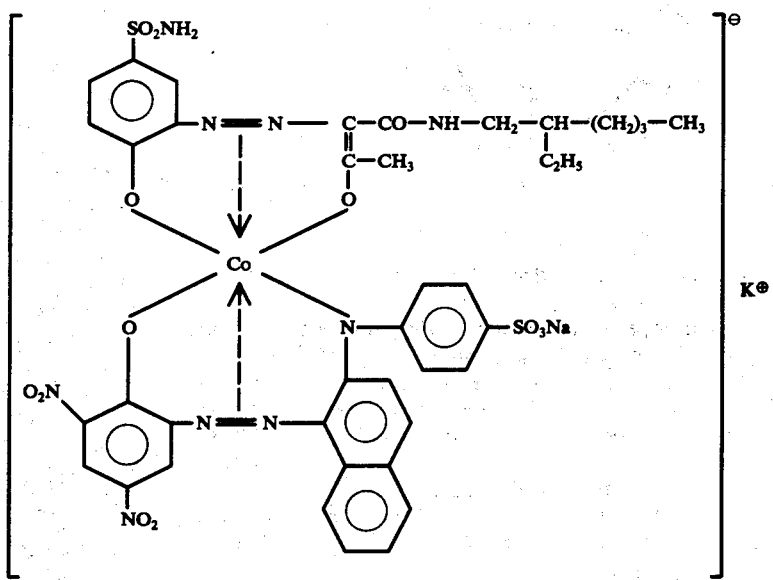

and dissolves readily in water and dyes natural and synthetic polyamide fibres in olive green shades.

The dyeings show notable fastness to light, rubbing and wet treatments such as water, sea water, milling and perspiration.

The 1:1 cobalt complex used as starting material in the above procedure is produced as follows.

A solution of 28 parts of cobaltous sulphate × 7H$_2$O and 42 parts of sodium nitrite in 400 parts of water is prepared. At 10° 51 parts of the dye obtained by acid coupling of diazotized 2-amino-1-hydroxy-4,6-dinitrobenzene to 2-phenylaminonaphthalene-4'-sulphonic acid are added, whereupon the dye goes partly into solution. To complete dissolution, 50 parts of dimethylformamide are added dropwise. The pH is maintained at 5.0–5.5 by adding hydrochloric acid. The metallising reaction commences at once and after approximately 2 hours is complete. Salt is added to precipitate the 1:1 cobalt complex and it is isolated by filtration, washed with water and dried.

The 1:1 cobalt complexes used as starting materials in Examples II to XIII are produced in an analogous manner.

EXAMPLE II–XIII

The following dyes can be produced in the same manner.

Examples II - XIII

| | 1:1 Co-Complex of the dye | reacted with | Color of the 1:2-Complexes |
|---|---|---|---|
| II | 2-amino-1-hydroxy-4,6-dinitrobenzene→2-phenylaminonaphthalene-4'-sulphonic acid | 2-amino-1-hydroxybenzene-4-sulphonic acid-amide→acetoacetylaminobenzene | olive |
| III | 2-amino-1-hydroxy-4,6-dinitrobenzene→2-phenylaminonaphthalene-2'-sulphonic acid | " | olive |
| IV | " | 2-amino-1-hydroxybenzene-4-sulphonic acid-amide→1-acetoacetylamino-2-ethylhexane | yellowish green |
| V | 2-amino-1-hydroxy-4,6-dinitrobenzene→2-phenylaminonaphthalene-6-sulphonic acid | 2-amino-1-hydroxybenzene-5-sulphonic acid-methylamide→1-acetoacetylamino-2-ethylhexane | olive |
| VI | 2-amino-1-hydroxy-4,6-dinitrobenzene→2-phenylaminonaphthalene-5-sulphonic acid | 2-amino-1-hydroxybenzene-4-sulphonic acid-amide→acetoacetylaminobenzene | Khaki |
| VII | 2-amino-4-chloro-1-hydroxy-5-nitrobenzine→2-phenylaminonaphthalene-4'-sulphonic acid | 2-amino-1-hydroxybenzene-4-sulphonic acid-methylamide acetoacetylaminocyclohexane | green |
| VIII | 2-amino-4,6-dichloro-1-hydroxybenzene→2-phenylaminonaphthalene-3'-sulphonic acid | 2-amino-1-hydroxybenzene-4-sulphonic acid-2'-hydroxypropylamide→acetoacetylaminobutane | yellowish green |
| IX | 2-amino-4,6-dinitro-1-hydroxybenzene→2-phenylaminonaphthalene-4'-sulphonic acid | 2-amino-1-hydroxybenzene-4-sulphonic acid-3'-mehthoxypropylamide→1-acetoacetylamino-2-chlorobenzene | olive |
| X | " | 2-amino-1-hydroxybenzene-4-sulphonic acid-amide→1-acetoacetylamino-2-chlorobenzene | olive |
| XI | 2-amino-4,6-dinitro-1-hydroxybenzene→2-phenylaminonaphthalene-4'-sulphonic acid | 2-amino-1-hydroxybenzene-5-sulphonic acid-methylamide→1-acetoacetylamino-2-chlorobenzene | olive |
| XII | " | 2-amino-1-hydroxybenzene-5-sulphonic acid methylamide→1-acetoacetylamionbenzene | olive |
| XIII | 2-amino-5-chloro-1-hydroxy-4-methoxybenzene→2-phenylaminonaphthalene-6-sulphonic acid | " | olive |
| XIV | 2-amino-1-hydroxy-4,6-dinitrobenzene→2-phenylaminonaphthalene-4'-sulphonic acid | 2-amino-1-hydroxybenzene-4-sulphonic acid-amide→1-acetoacetylamino-2-methylbenzene | olive |
| XV | " | 2-amino-1-hydroxybenzene-4-sulphonic acid-amide→1-acetoacetylamino-2-methoxybenzene | olive |
| XVI | " | 2-amino-1-hydroxybenzene-4-sulphonic acid-amide→1-acetoacetylamino-2,5-dimethoxybenzene | olive |

What is claimed is:

1. A complex of the formula

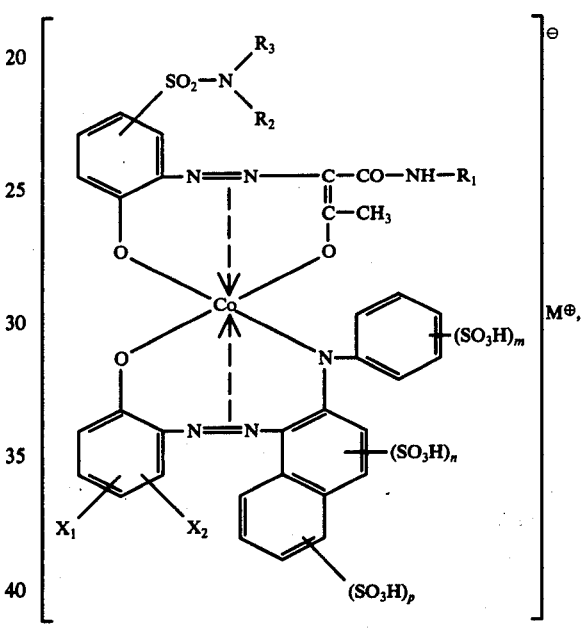

wherein
$R_1$ is alkyl of 1 to 12 carbon atoms, substituted alkyl wherein the alkyl chain has 1 to 12 carbon atoms and each substituent is independently halo, cyano or lower alkoxy, cyclohexyl, phenyl or substituted phenyl wherein each substituent is independently halo, lower alkyl, lower alkoxy, cyano, carboxy or lower alkoxy carbonyl, each of $R_2$ and $R_3$ is independently hydrogen, lower alkyl or substituted lower alkyl wherein each substituent is independently halo, hydroxy or lower alkoxy, each of $X_1$ and $X_2$ is independently halo, nitro, trifluoromethyl, alkyl of 1 to 6 carbon atoms, substituted alkyl, alkoxy of 1 to 6 carbon atoms or substituted alkoxy, wherein each alkyl chain of substituted alkyl and alkoxy chain of substituted alkoxy independently has 1 to 6 carbon atoms and each substituent is independently halo, trifluoromethyl or cyano, $M^\oplus$ is lithium, sodium, potassium or ammonium, $m$ is 0 or 1, $n$ is 0 or 1, and $p$ is 0 or 1, with the proviso that the sum of $m$, $n$ and $p$ is 1, wherein each halo is independently chloro or bromo.

2. A complex according to claim 1
wherein $R_1$ is alkyl of 1 to 12 carbon atoms, alkyl of 1 to 12 carbon atoms substituted by halo, lower alkoxy or cyano, cyclohexyl, phenyl or phenyl substituted by halo, lower alkyl, lower alkoxy, cyano, carboxy or lower alkoxycarbonyl,
each of $R_2$ and $R_3$ is independently hydrogen, lower alkyl or lower alkyl substituted by halo, hydroxy or lower alkoxy, and
each of $X_1$ and $X_2$ is independently halo, nitro, trifluoromethyl, alkyl of 1 to 6 carbon atoms, alkyl of 1 to 6 carbon atoms substituted by halo, trifluoromethyl or cyano, alkoxy of 1 to 6 carbon atoms or alkoxy of 1 to 6 carbon atoms substituted by halo, trifluoromethyl or cyano,
wherein each halo is independently chloro or bromo.

3. A complex according to claim 2 having the formula

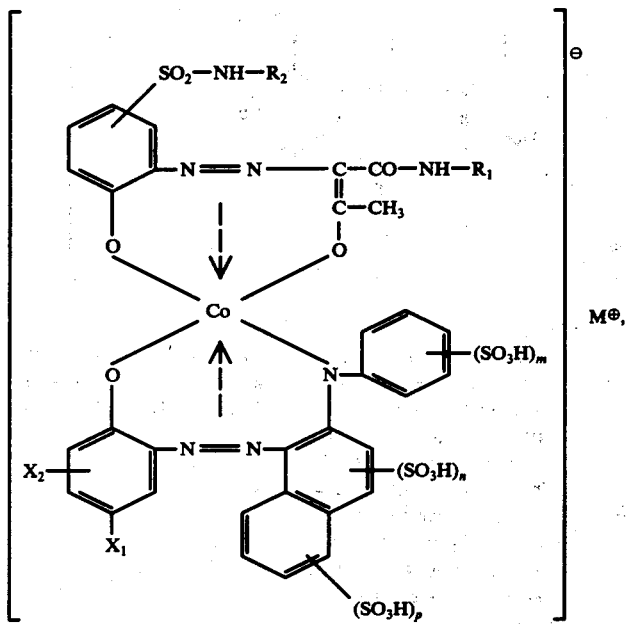

wherein $R_1$ is alkyl of 4 to 12 carbon atoms, cyclohexyl, phenyl or halophenyl,
$R_2$ is hydrogen, alkyl of 1 to 4 carbon atoms or alkyl of 1 to 4 carbon atoms substituted by hydroxy or lower alkoxy,
$X_1$ is nitro, halo or lower alkoxy,
$X_2$ is nitro or halo,
$M^\oplus$ is lithium, sodium, potassium or ammonium,
$m$ is 0 or 1,
$n$ is 0 or 1, and
$p$ is 0 or 1,
With the provisos that
 a. the $SO_2NH-R_2$ group is para to the oxygen atom or para to the azo group attached to the benzene ring to which it is attached,
 b. the $X_2$ substituent is meta or para to the azo group attached to the benzene ring to which it is attached, and
 c. the sum of $m$, $n$ and $p$ is 1.

4. A complex according to claim 3 having the formula

5. A complex according to claim 3 having the formula
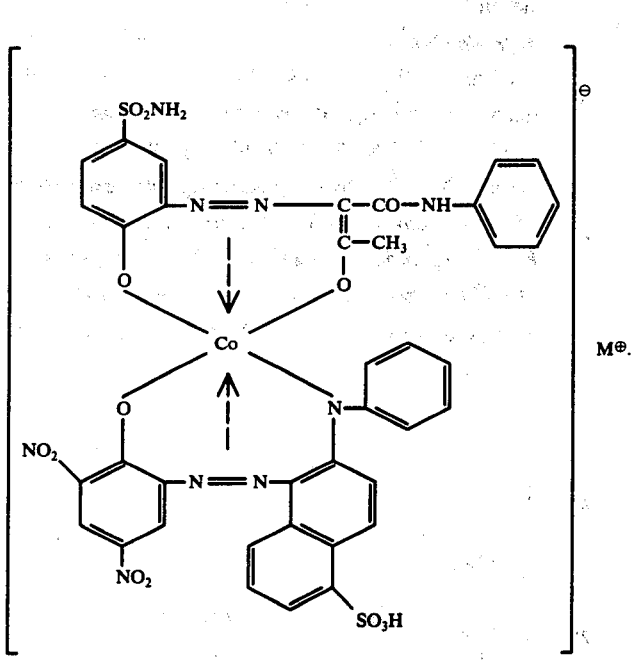
6. A complex according to claim 1 having the formula
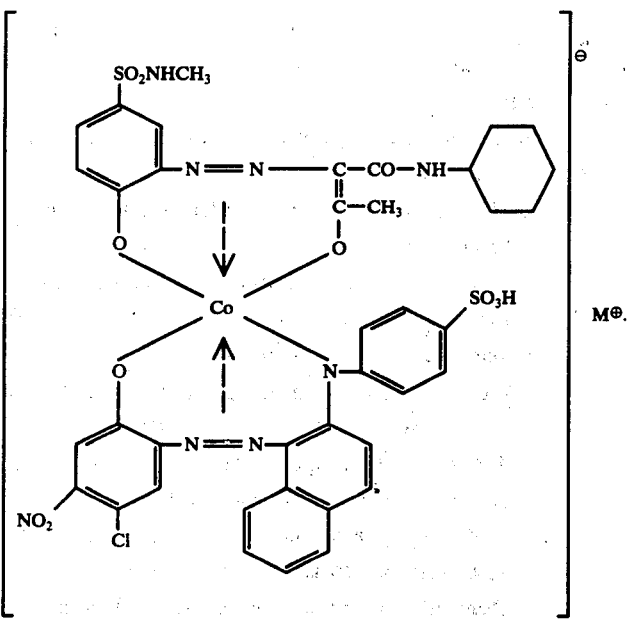

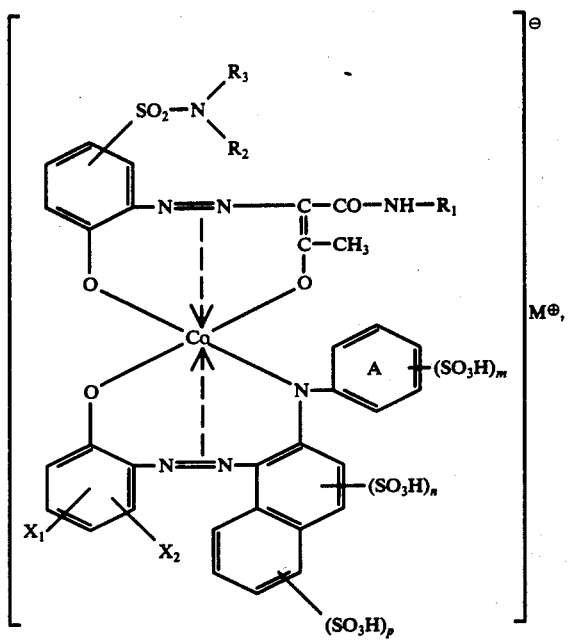

wherein
R₁ is alkyl of 1 to 12 carbon atoms, alkyl of 1 to 12 carbon atoms substituted by halo, lower alkoxy or cyano, cyclohexyl, phenyl or halophenyl,
each of $R_2$ and $R_3$ is independently hydrogen or alkyl of 1 to 4 carbon atoms,
each of $X_1$ and $X_2$ is independently halo or nitro,
$M^\oplus$ is lithium, sodium, potassium or ammonium,
m is 0 or 1,
n is 0 or 1,
p is 0 or 1,
with the proviso that the sum of m, n and p is 1, wherein each halo is independently chloro or bromo.

7. A complex according to claim 6 having the formula

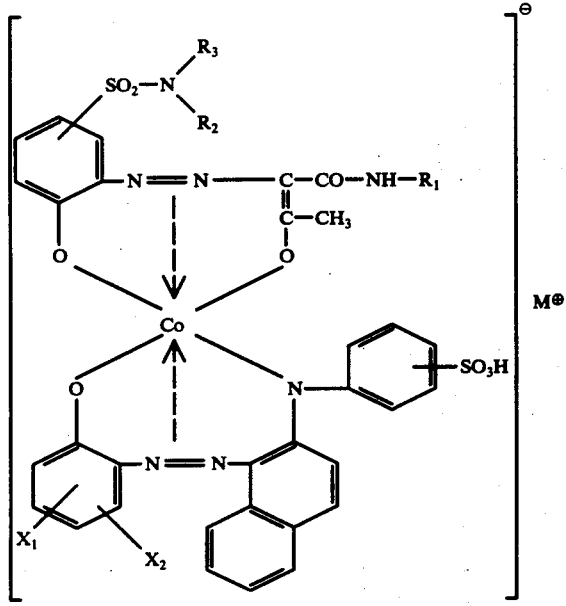

wherein
R₁ is alkyl of 4 to 12 carbon atoms, cyclohexyl, phenyl or halophenyl,
each of $R_2$ and $R_3$ is independently hydrogen or alkyl of 1 to 4 carbon atoms,
each of $X_1$ and $X_2$ is independently nitro or halo, and
$M^\oplus$ is lithium, sodium, potassium or ammonium.

8. A complex according to claim 7, wherein R₁ is alkyl of 4 to 12 carbon atoms, cyclohexyl or phenyl.

9. A complex according to claim 7 having the formula

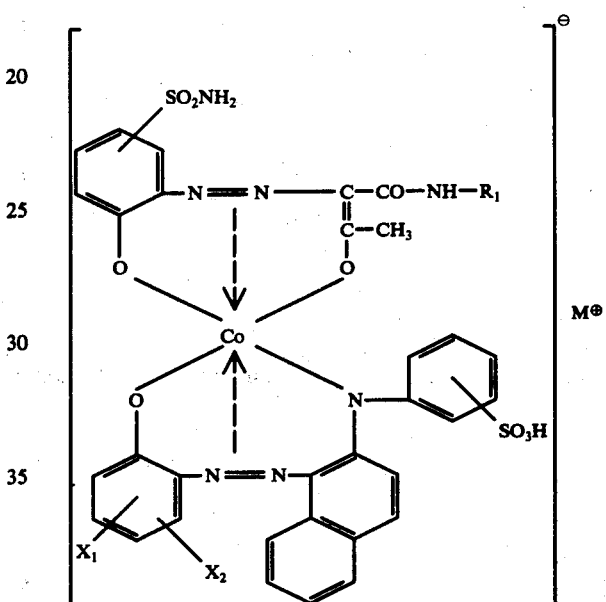

wherein
R₁ is branched alkyl of 6 to 10 carbon atoms, phenyl or halophenyl,
each of $X_1$ and $X_2$ is independently nitro, chloro or bromo, and
$M^\oplus$ is lithium, sodium, potassium or ammonium, with the provisos that
a. one of $X_1$ and $X_2$ is ortho to the oxygen atom and the other is para to the oxygen atom attached to the benzene ring to which they are attached,
b. the -SO₂NH₂ group is para to the oxygen atom or para to the azo group attached to the benzene ring to which it is attached, and
c. the SO₃H group is ortho or para to the nitrogen atom attached to the benzene ring to which it is attached.

10. A complex according to claim 9 wherein R₁ is branched alkyl of 6 to 10 carbon atoms or phenyl.

11. A complex according to claim 9 having the formula

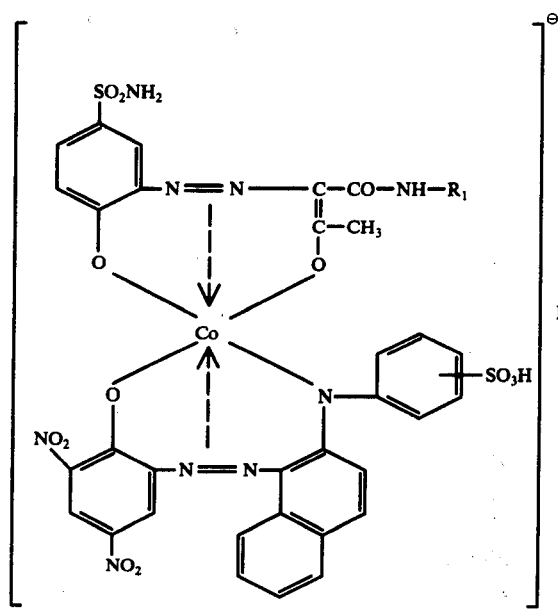
wherein
R₁ is branched alkyl of 6 to 10 carbon atoms, phenyl or chlorophenyl, and
M⊕ is lithium, sodium, potassium or ammonium, with the proviso that the SO₃H group is ortho or para to the nitrogen atom attached to the benzene ring to which it is attached.
12. A complex according to claim 11 having the formula
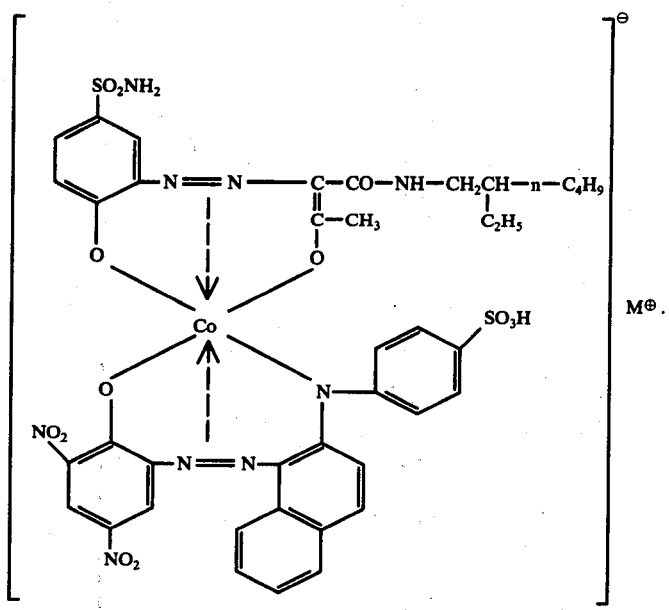
13. A complex according to claim 11 having the formula

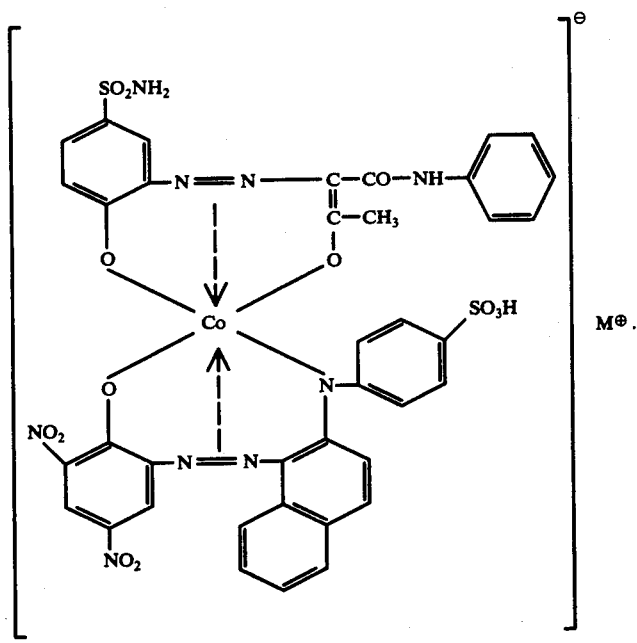
14. A complex according to claim 11 having the formula
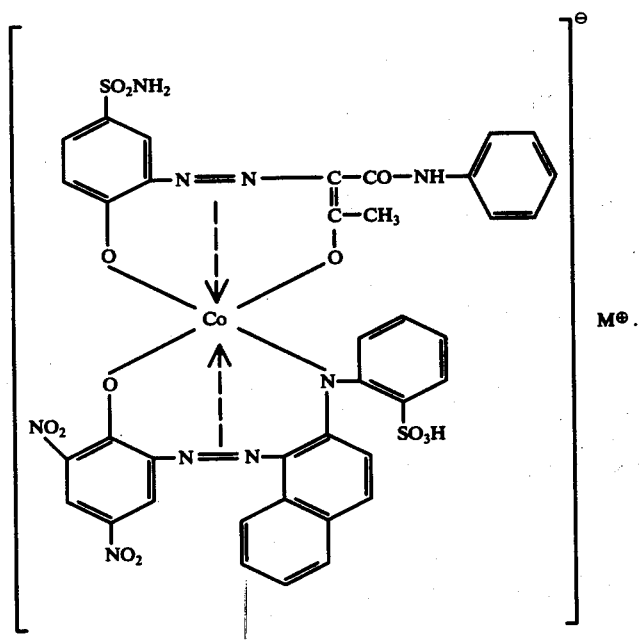
15. A complex according to claim 11 having the formula

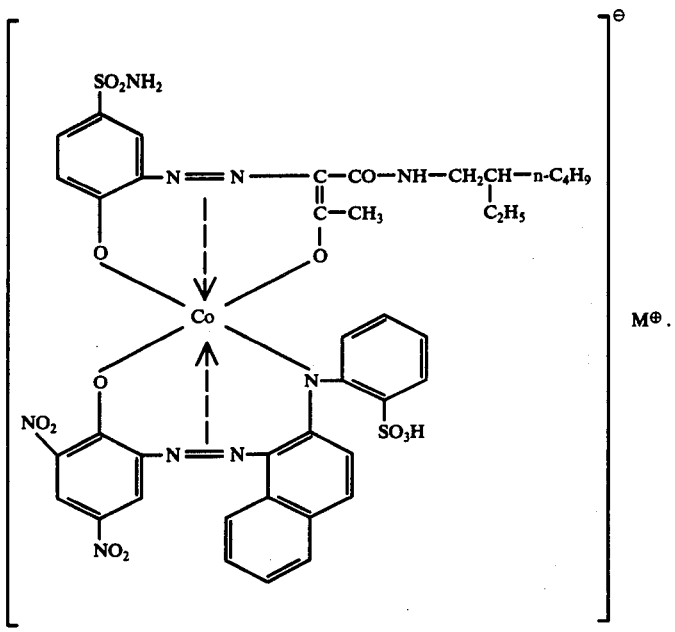
16. A complex according to claim 11 having the formula
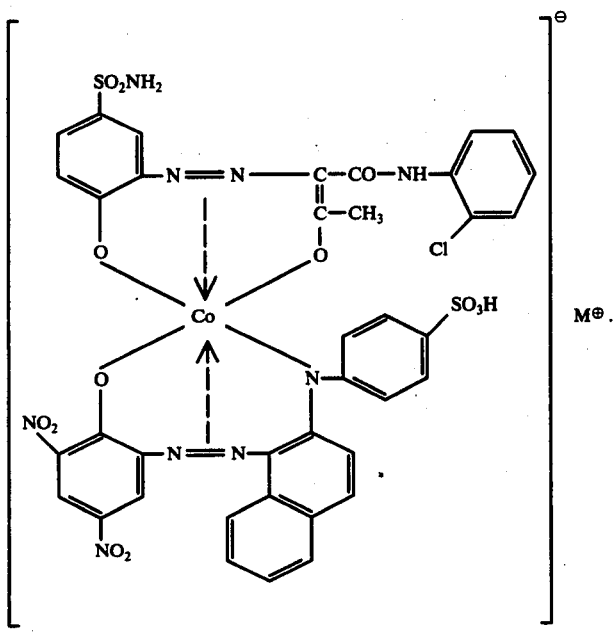
17. A composition of matter consisting essentially of a complex according to claim 7 having the formula

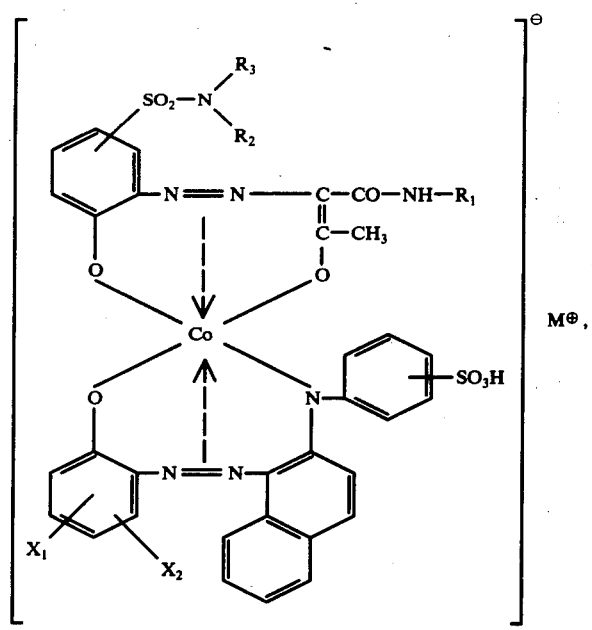

wherein
R₁ is alkyl of 4 to 12 carbon atoms, cyclohexyl, phenyl or halophenyl,
each of R₂ and R₃ is independently hydrogen or alkyl of 1 to 4 carbon atoms,
each of $X_1$ and $X_2$ is independently nitro or halo, and
M⊕ is lithium, sodium, potassium or ammonium.

18. As a composition of matter, an asymmetrical 1:2 cobalt complex according to claim 7 substantially free of symmetrical 1:2 cobalt complex.

19. A complex according to claim 1 wherein
R₁ is alkyl of 1 to 12 carbon atoms, cyclohexyl, phenyl or substituted phenyl each substituent of which is independently halo, lower alkyl or lower alkoxy,
each of $X_1$ and $X_2$ is independently halo, nitro, alkyl of 1 to 6 carbon atoms or alkoxy of 1 to 6 carbon atoms, and
each of R₁ and R₂ is independently hydrogen, lower alkyl or lower alkyl substituted by halo, hydroxy or lower alkoxy.

20. A composition of matter consisting essentially of a complex according to claim 1 having the formula

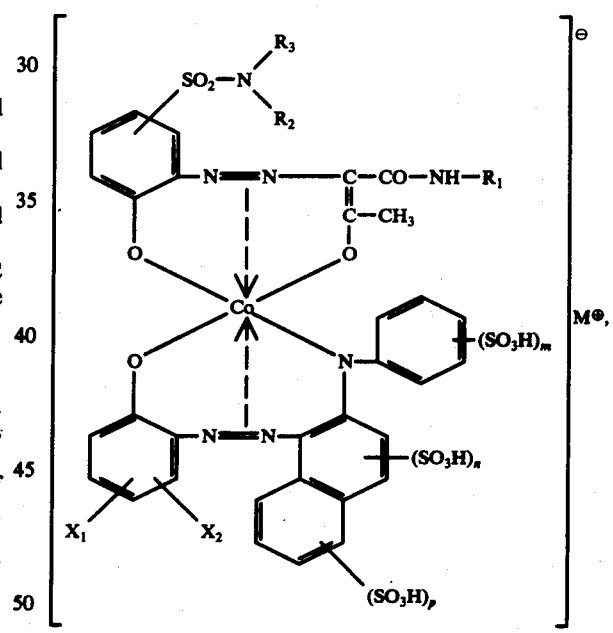

* * * * *